(12) United States Patent
Kumar et al.

(10) Patent No.: US 10,156,082 B2
(45) Date of Patent: *Dec. 18, 2018

(54) TWO-WHEEL ACTUATOR STEERING SYSTEM AND METHOD FOR POOL CLEANER

(71) Applicant: Pentair Water Pool and Spa, Inc., Cary, NC (US)

(72) Inventors: Satheesh Kumar, Nagapattinam (IN); Om Prakash Maurya, Chandigarh (IN); Narender Sanwal, New Delhi (IN)

(73) Assignee: Pentair Water Pool and Spa, Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/332,847

(22) Filed: Oct. 24, 2016

(65) Prior Publication Data

US 2017/0037649 A1    Feb. 9, 2017

Related U.S. Application Data

(63) Continuation of application No. 14/204,640, filed on Mar. 11, 2014, now Pat. No. 9,476,216.

(Continued)

(51) Int. Cl.
*E04H 4/16* (2006.01)
*B62D 11/10* (2006.01)

(52) U.S. Cl.
CPC .......... *E04H 4/1654* (2013.01); *B62D 11/10* (2013.01); *Y10T 74/18296* (2015.01)

(58) Field of Classification Search
CPC ....... B62D 11/10; B62D 3/02; E04H 4/18296; E04H 4/1663; E04H 4/1636; Y10T 74/18296
See application file for complete search history.

(56) References Cited

U.S. PATENT DOCUMENTS

| | | | |
|---|---|---|---|
| 1,200,308 A | 10/1916 | Bunnell | |
| 3,439,368 A | 4/1969 | Myers | |

(Continued)

FOREIGN PATENT DOCUMENTS

| | | |
|---|---|---|
| ES | 2374887 A1 | 2/2012 |
| WO | 9002265 A1 | 3/1990 |

(Continued)

OTHER PUBLICATIONS

Supplemental European Search Report for PCT/US2014023728; dated Dec. 12, 2016; 8 pp.

*Primary Examiner* — Dung Van Nguyen
(74) *Attorney, Agent, or Firm* — Quarles & Brady LLP

(57) ABSTRACT

Embodiments provide a pool cleaner with a housing, a first drive wheel positioned along a first side of the housing, and a second drive wheel positioned along a second side of the housing. The pool cleaner also includes a steering system engaged with the first drive wheel and the second drive wheel. The steering system includes a rotating cam with a first cam profile and a second cam profile different from the first cam profile. The steering system drives the housing in a cycle of forward and turn movements by rotating the first drive wheel based on the first cam profile and rotating the second drive wheel based on the second cam profile.

16 Claims, 12 Drawing Sheets

Related U.S. Application Data

(60) Provisional application No. 61/776,450, filed on Mar. 11, 2013.

(56) References Cited

U.S. PATENT DOCUMENTS

| | | |
|---|---|---|
| 3,551,930 A | 1/1971 | Myers |
| 3,860,518 A | 1/1975 | Henricksen |
| 3,921,654 A | 11/1975 | Pansini |
| 3,979,788 A | 9/1976 | Strausak |
| 4,007,996 A | 2/1977 | Boone |
| 4,177,009 A | 12/1979 | Baum, Sr. et al. |
| 4,536,908 A | 8/1985 | Raubenheimer |
| 4,718,613 A | 1/1988 | Moomaw |
| 4,722,110 A | 2/1988 | Chandler |
| 4,789,364 A | 12/1988 | Chauvier et al. |
| 4,835,810 A | 6/1989 | Hugo |
| 5,001,800 A | 3/1991 | Parenti et al. |
| 5,002,461 A | 3/1991 | Young |
| 5,105,496 A | 4/1992 | Gray, Jr. et al. |
| 5,412,826 A | 5/1995 | Raubenheimer |
| 5,435,031 A | 7/1995 | Minami et al. |
| 5,507,058 A | 4/1996 | Minami et al. |
| 5,584,656 A | 12/1996 | Rose |
| 5,617,600 A | 4/1997 | Frattini |
| 5,771,987 A | 6/1998 | Marbach |
| 5,797,156 A | 8/1998 | Sebor |
| 5,933,899 A | 8/1999 | Campbell et al. |
| D417,047 S | 11/1999 | Tsuda |
| 5,985,156 A | 11/1999 | Henkin et al. |
| 6,039,886 A | 3/2000 | Henkin et al. |
| 6,094,764 A | 8/2000 | Veloskey et al. |
| 6,115,864 A | 9/2000 | Davidsson et al. |
| 6,212,725 B1 | 4/2001 | Porat |
| D444,280 S | 6/2001 | Rief et al. |
| 6,280,611 B1 | 8/2001 | Henkin et al. |
| 6,292,970 B1 | 9/2001 | Rief et al. |
| 6,365,039 B1 | 4/2002 | Henkin et al. |
| RE38,479 E | 3/2004 | Henkin et al. |
| 6,782,578 B1 | 8/2004 | Rief et al. |
| 6,854,148 B1 | 2/2005 | Rief et al. |
| 7,039,980 B2 | 5/2006 | Van Der Meyden et al. |
| D529,669 S | 10/2006 | Blanc |
| 7,117,554 B2 | 10/2006 | Pichon |
| 7,162,763 B2 | 1/2007 | Henkin et al. |
| 7,201,563 B2 | 4/2007 | Studebaker |
| 7,243,389 B2 | 7/2007 | Phillipson et al. |
| 7,293,314 B2 | 11/2007 | Henkin et al. |
| D575,915 S | 8/2008 | Dreyer |
| 7,464,429 B2 | 12/2008 | Stoltz |
| 7,520,282 B2 | 4/2009 | Stoltz |
| D598,168 S | 8/2009 | Sumonthee |
| D599,967 S | 9/2009 | Blanc-Tailleur |
| 7,736,523 B2 | 6/2010 | King |
| 7,765,639 B2 | 8/2010 | Lee et al. |
| 7,849,547 B2 | 12/2010 | Erlich et al. |
| 8,117,704 B2 | 2/2012 | Schneider et al. |
| D670,459 S | 11/2012 | Mastio et al. |
| D670,460 S | 11/2012 | Mastio et al. |
| D670,461 S | 11/2012 | Mastio et al. |
| D670,462 S | 11/2012 | Mastio et al. |
| D670,463 S | 11/2012 | Mastio et al. |
| D670,464 S | 11/2012 | Mastio et al. |
| D670,465 S | 11/2012 | Mastio et al. |
| 8,307,485 B2 | 11/2012 | Sumonthee |
| 8,397,330 B2 | 3/2013 | Pichon et al. |
| 8,402,585 B2 | 3/2013 | Rief et al. |
| 8,402,586 B2 | 3/2013 | Lavabre |
| 8,424,142 B2 | 4/2013 | Garti |
| D684,738 S | 6/2013 | Richiuso et al. |
| 8,474,081 B2 | 7/2013 | Stoltz |
| 8,505,143 B2 | 8/2013 | Finezilber |
| 8,510,889 B2 | 8/2013 | Hui et al. |
| 8,595,880 B2 | 12/2013 | Pichon et al. |
| 9,476,216 B2 * | 10/2016 | Kumar et al. ........ E04H 4/1654 15/301.7 |
| 2005/0126969 A1 | 6/2005 | Dolton |
| 2008/0125943 A1 | 5/2008 | Finezilber |
| 2008/0128343 A1 | 6/2008 | Garti |
| 2008/0168610 A1 | 7/2008 | Halle et al. |
| 2008/0307589 A1 | 12/2008 | Schneider et al. |
| 2009/0300862 A1 | 12/2009 | Schneider et al. |
| 2009/0307854 A1 | 12/2009 | Garti |
| 2010/0119358 A1 | 5/2010 | Van Der Meijden et al. |
| 2011/0154585 A1 | 6/2011 | Mastio et al. |
| 2011/0162683 A1 | 7/2011 | Mastio et al. |
| 2011/0301752 A1 | 12/2011 | Finezilber |
| 2012/0060307 A1 | 3/2012 | Stoltz |
| 2012/0144605 A1 | 6/2012 | Dewings |
| 2012/0174326 A1 | 7/2012 | Finezilber |
| 2012/0210527 A1 | 8/2012 | Erlich et al. |
| 2012/0285486 A1 | 11/2012 | Erlich et al. |
| 2013/0081216 A1 | 4/2013 | Gopalan et al. |
| 2013/0091641 A1 | 4/2013 | Ben Zion |
| 2013/0133145 A1 | 5/2013 | Pichon et al. |
| 2013/0152316 A1 | 6/2013 | Rief et al. |

FOREIGN PATENT DOCUMENTS

| | | |
|---|---|---|
| WO | 2010029388 A1 | 3/2010 |
| WO | 2011100067 A1 | 8/2011 |

* cited by examiner

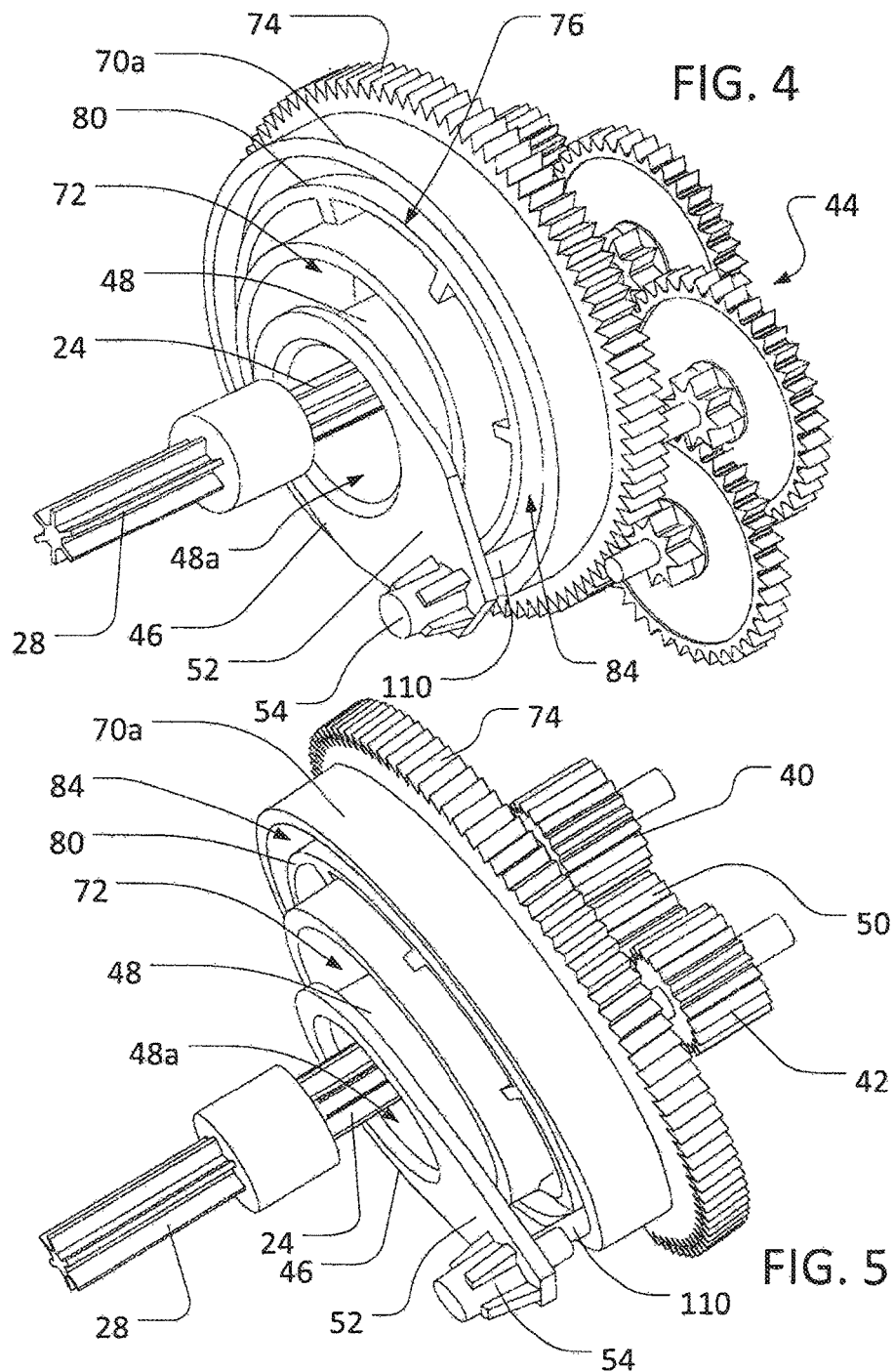

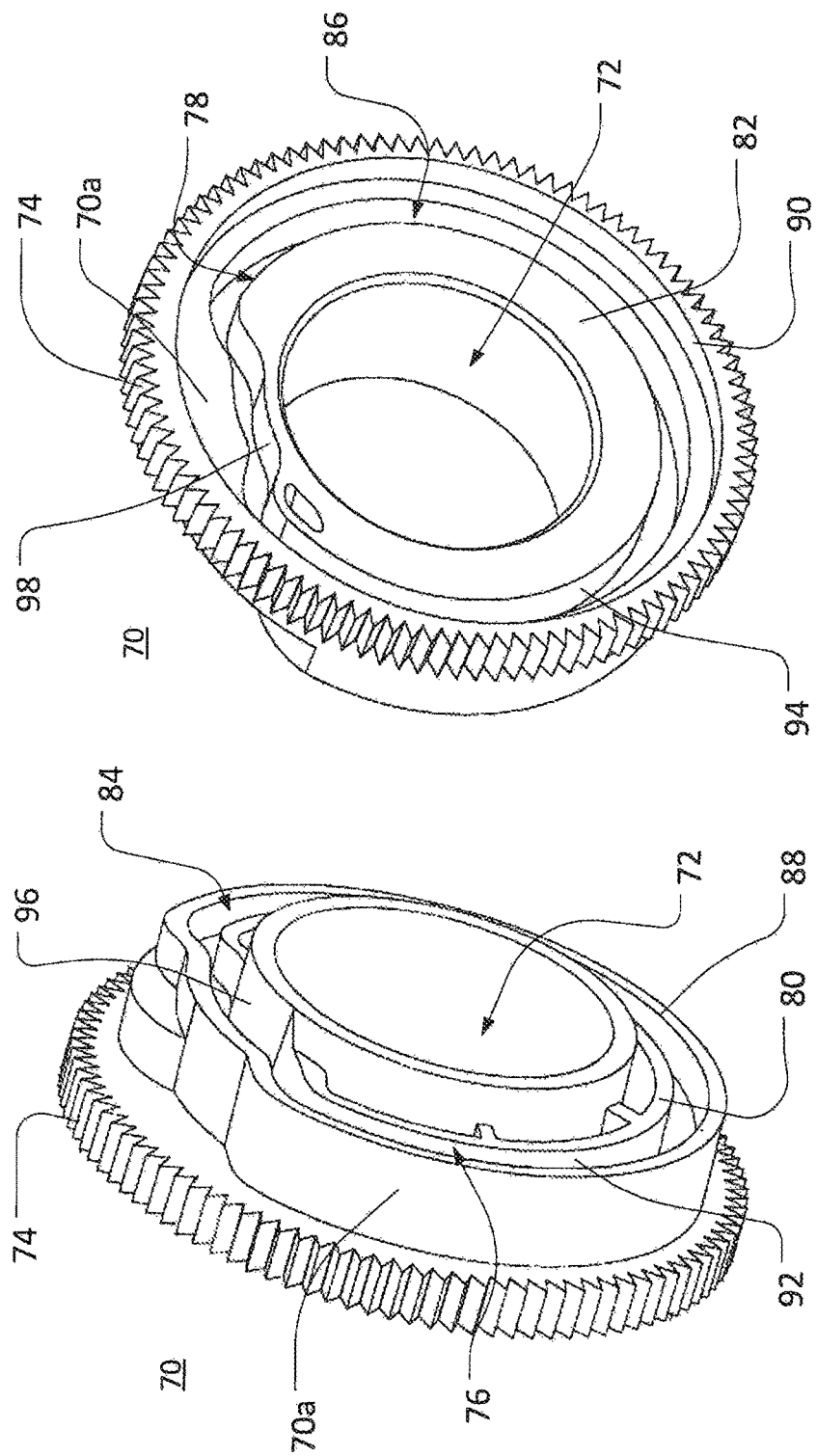

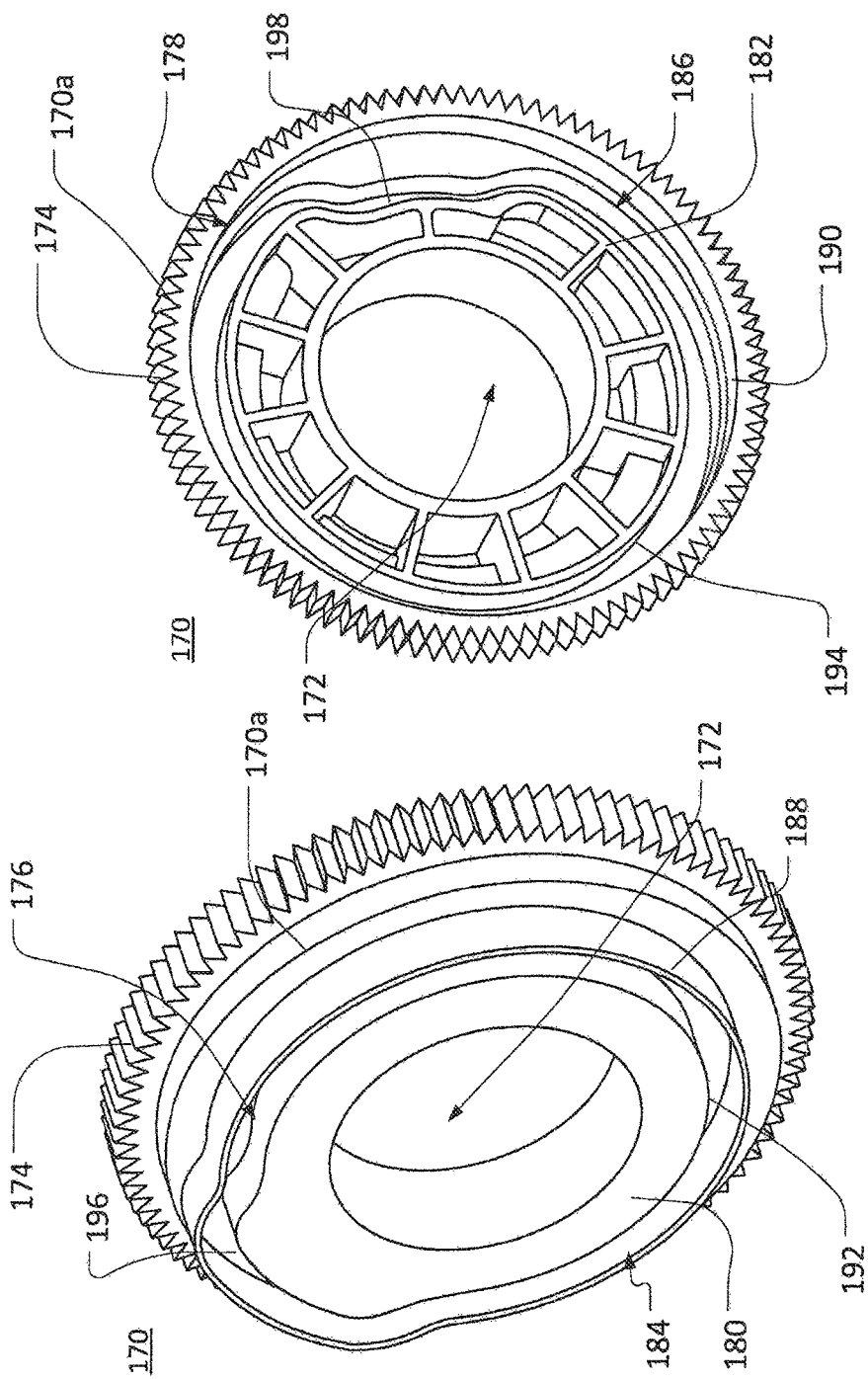

TWO-WHEEL ACTUATOR STEERING SYSTEM AND METHOD FOR POOL CLEANER

RELATED APPLICATIONS

This application claims priority to U.S. Provisional Application No. 61/776,450 filed on Mar. 11, 2013, and to U.S. application Ser. No. 14/204,640 filed on Mar. 11, 2014, the entire contents of which are incorporated herein by reference.

BACKGROUND

Automatic swimming pool cleaners include components for driving the pool cleaners along the floor and sidewalls of a swimming pool, either in a random or deliberate manner. For example, conventional pressure side cleaners and suction side cleaners often use hydraulic turbine assemblies as drive systems to drive one or more wheels. Robotic cleaners often include a motor and/or other mechanical system powered by an external power source to drive one or more wheels.

With respect to pressure side cleaners and suction cleaners, vacuum systems of the cleaners (e.g., to vacuum debris from the floor and sidewalk and deposit the debris into a debris bag or debris canister) are often integrated with the cleaners' drive systems. As a result, changes occurring in the drive system, such as turning or reversing motion, can affect the vacuum system. In some conventional pool cleaners, vacuum systems are only capable of vacuuming debris during forward motion of the drive system. In other conventional pool cleaners, rotation of separate drive wheels is linked such that the wheels may not be rotated independently of each other. Accordingly, these cleaners may not be steered by independent rotation of the drive wheels.

One known pool cleaning system includes sets of belt driven drive rollers, with a geared transmission providing power to the sets of rollers from a drive module. A single cam moves a shaft between different orientations in order to engage different gears associated with a single set of the drive rollers and thereby collectively drive the single set of the drive rollers in either a forward or a reverse direction. Such a system may not allow for independent control of different sets of rollers, which may limit the types of movement that may be executed by the system.

Another known pool cleaning system includes a plurality of separate cams that independently control drive wheels. Each cam causes a respective drive shaft to periodically pivot so that a first gear on each drive shaft engages peripheral teeth on the corresponding wheel to drive the wheel forward, or so that a second gear on the drive shaft engages central wheel teeth to drive the wheel in reverse. Such an arrangement may introduce undesirable complexity into the manufacture, assembly, and maintenance of the system.

Therefore, it would be desirable to provide a pool cleaner that addresses one or more of the above deficiencies. For example, it would be desirable to have a pool cleaner that provides for independent control of the rotational direction of multiple drive wheels and continuous cleaning capability regardless of travel direction, with relatively low complexity of manufacturing, assembly, or maintenance.

SUMMARY

Some embodiments provide a pool cleaner including a housing, a first drive wheel positioned along a first side of the housing, and a second drive wheel positioned along a second side of the housing. The pool cleaner also includes a steering system engaged with the first drive wheel and the second drive wheel. The steering system includes a rotating cam with a first cam profile and a second cam profile different from the first cam profile, and drives the housing in a cycle of forward and turn movements by rotating the first drive wheel based on the first cam profile and rotating the second drive wheel based on the second cam profile.

Further embodiments provide a method of operating a pool cleaner including a turbine paddle a first drive wheel, and a second drive wheel. The method includes providing a cam with a first cam profile and a second cam profile different than the first cam profile. Each of the first cam profile and the second cam profile include an annular portion and a non-annular portion. The method also includes engaging a first actuator with the first cam profile and a second actuator with the second cam profile, where the first actuator drives the first drive wheel based on the first cam profile and the second actuator drives the second drive wheel based on the second cam profile, and rotating the cam in response to rotation of the turbine paddle to drive the pool cleaner.

Additional embodiments provide a pool cleaner including a first drive wheel and a second drive wheel. The pool cleaner also includes a rotating cam including a first cam profile and a second cam profile different than the first cam profile, a first drive shaft in communication with the first drive wheel, and a second drive shaft in communication with the second drive wheel. The pool cleaner further includes a first actuator in communication with the first drive shaft and the first cam profile, and a second actuator in communication with the second drive shaft and the second cam profile. The first actuator follows the first cam profile as the cam rotates and causes the first drive shaft to drive the first drive wheel in one of a forward direction and a reverse direction based on a position of the first actuator along the first cam profile. The second actuator follows the second cam profile as the cam rotates and causes the second drive shaft to drive the second drive wheel in one of a forward direction and a reverse direction based on a position of the second actuator along the second cam profile.

DESCRIPTION OF THE DRAWINGS

FIG. 4 is an is an isometric view of a portion of the steering system of FIG. 2 including the cam, a pivot gear, a drive shaft, an actuator, and a timing gear set;

FIG. 5 is another isometric view of the portion of the steering system of FIG. 4 with the timing gear set removed to show drive change gears;

FIGS. 7A and 7B are front and rear isometric views, respectively, of the cam of the steering system of FIG. 2;

FIGS. 8A and 8B are front and rear isometric views, respectively, of another cam;

DETAILED DESCRIPTION

Figure 1:
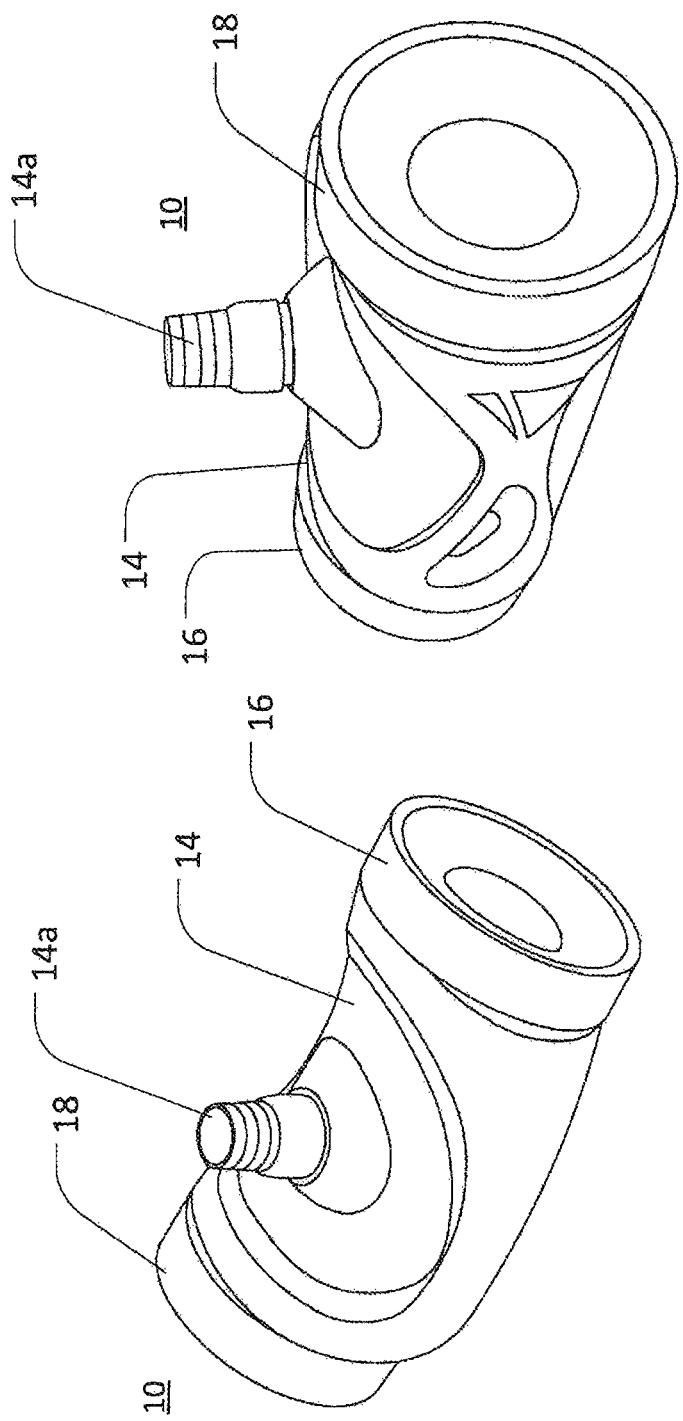
FIGS. 1A and 1B are isometric views of a pool cleaner for use with the steering system described herein.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, it may be useful to provide a steering system for a pool cleaner that allows for independent rotation of different pool cleaner wheels in different (or the same) directions (e.g., to drive the pool cleaner in forward, reverse, or turning operations). In certain embodiments, a steering system for this purpose may include a series of gears that drives two wheels of a pool cleaner independently by way of the interaction of various steering system components with a single cam, where the single cam includes at least two different cam profiles to guide rotation of the different wheels. A forward drive-change gear and a reverse drive-change gear may be provided for each wheel, with the forward and reverse drive-change gears of each set being driven in opposite directions by a water-driven turbine of the pool cleaner.

In certain embodiments, a first actuator may be in communication with one of the cam profiles and a drive shaft for one wheel, in order to cause the drive Shaft to engage either the forward drive-change gear (causing forward wheel movement) or the backward drive-change gear (causing reverse wheel movement) for that wheel. For example, a first actuator pin may follow a first cam profile as the cam rotates (e.g., as driven by a timing gear set in communication with the turbine), with the passage of different portions of the first cam profile past the first actuator pin causing the first actuator to place the associated drive shaft in a forward-drive or reverse-drive orientation. Likewise, a second actuator may be in communication with a second cam profile and a drive shaft for the other wheel, in order to cause the drive shaft to engage either the forward drive-change gear (causing forward wheel movement) or the backward drive-change gear (causing reverse wheel movement) for that wheel. For example, a second actuator pin may follow a second cam profile as the cam rotates, with the passage different portions of the second cam profile past the second actuator pin causing the second actuator to place the associated drive shaft in a forward-drive or reverse-drive orientation.

In this way, for example, each wheel may be individually switched between forward and reverse movement in order to allow forward, reverse, and turning movements of the pool cleaner, but only a single cam may be required. Further, because changes in direction for the wheels may be based on the respective actuator pins' position along the two cam profiles and the cam may rotate relatively continuously, the steering mechanism may provide for a repeatable cycle of movement (e.g., various specific periods of forward, reverse, and turning travel) that executes over a specified time period (e.g., the time period for a full rotation of the cam). Finally, in various embodiments, a cleaner employing such a system may be able to provide cleaning suction (or other functions) regardless of the direction of travel of the various wheels.

Referring now to FIGS. 1A and 1B, an example pool cleaner 10 is depicted, which may utilize a steering system 12 (see, e.g., FIG. 2) for control of the movement of the pool cleaner 10. The pool cleaner 10 may be configured as a suction-side pool cleaner, or as various other types of pool cleaners (e.g., a pressure-side pool cleaner) known in the art. The pool cleaner 10 generally includes a housing 14 and opposing first and second wheels 16 and 18. The wheels 16 and 18 are in communication with the steering system 12 (not shown in FIG. 1), which is disposed within the housing 14.

Referring to FIGS. 2-5, the pool cleaner 10 is designed to be driven by a turbine paddle 20, which is in communication with and drives various components of the steering system 12, as described in more detail below. The turbine paddle 20 is provided as a paddle wheel with a generally cylindrical base portion 36 having a plurality of curved blades 38 extending outwardly therefrom. Each blade 38 may protrude outwardly from the base portion 36 until terminating at a curved end piece 38a. The turbine paddle 20 depicted in FIG. 2 includes six blades 38, although it is contemplated that the turbine paddle 20 may include more or less than six blades 38. The turbine paddle 20 is provided within the housing 14 of the pool cleaner 10 and is positioned between an inlet opening (not shown) in the pool cleaner 10 and an outlet orifice 14a (see FIGS. 1A and 1B). To this end, at least a portion of fluid moving through the pool cleaner 10 (e.g., as caused by a suction source (not shown) operably coupled to pool cleaner 10) is directed across or around the turbine paddle 20 and contacts one or more blades 38 to cause rotation of the turbine paddle 20.

The turbine paddle 20 includes a turbine paddle gear 22 provided in the form of a cylindrical shaft extending out of opposing sides of the turbine paddle 20. Each end of the shaft of paddle gear 22 includes a toothed profile defined by toothed portions 22a and 22b, and is designed to rotate with the turbine paddle 20, which indirectly drives rotation of drive shafts 24 and 26. The drive shafts 24 and 26, respectively, cause rotation of pivot gears 28 and 30, which engage toothed inner profiles 32 of the wheels 16 and 18 to rotate the wheels 16, 18. Pivot gears 28 and 30 are configured as cylindrical toothed bodies extending between the toothed inner profiles 32 and 34 and the drive shafts 24 and 26, respectively. The connections between the pivot gears 28 and 30 and the drive shafts 24 and 26, respectively, are configured to allow the rotational axis of each of the pivot gears 28 and 30 to pivot, respectively, with respect to the rotational axis of each of the drive shafts 24 and 26. Accordingly, rotational power may be transferred to the wheels 16 and 18 from the drive shafts 24 and 26 via the pivot gears 28 and 30 even though the relative alignment of the rotational axes of the pivot gears 28 and 30 with respect to the rotational axes of the drive shafts 24 and 26 may change.

Figure 2:
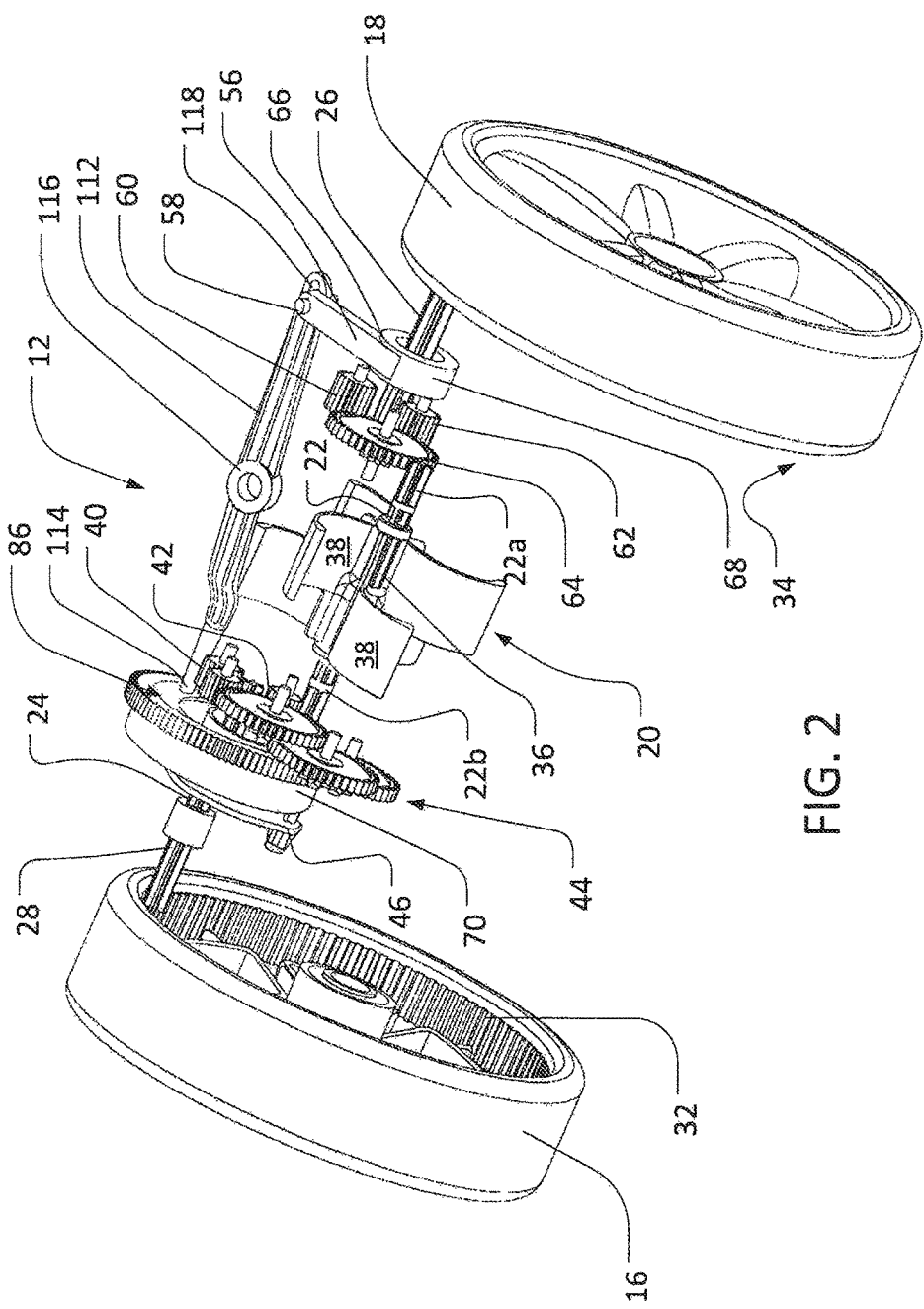
FIG. 2 is an isometric view of a steering system having two wheels in communication with at least a cam, various gears and gear trains, and a turbine paddle, according to one embodiment.
Figure 3:
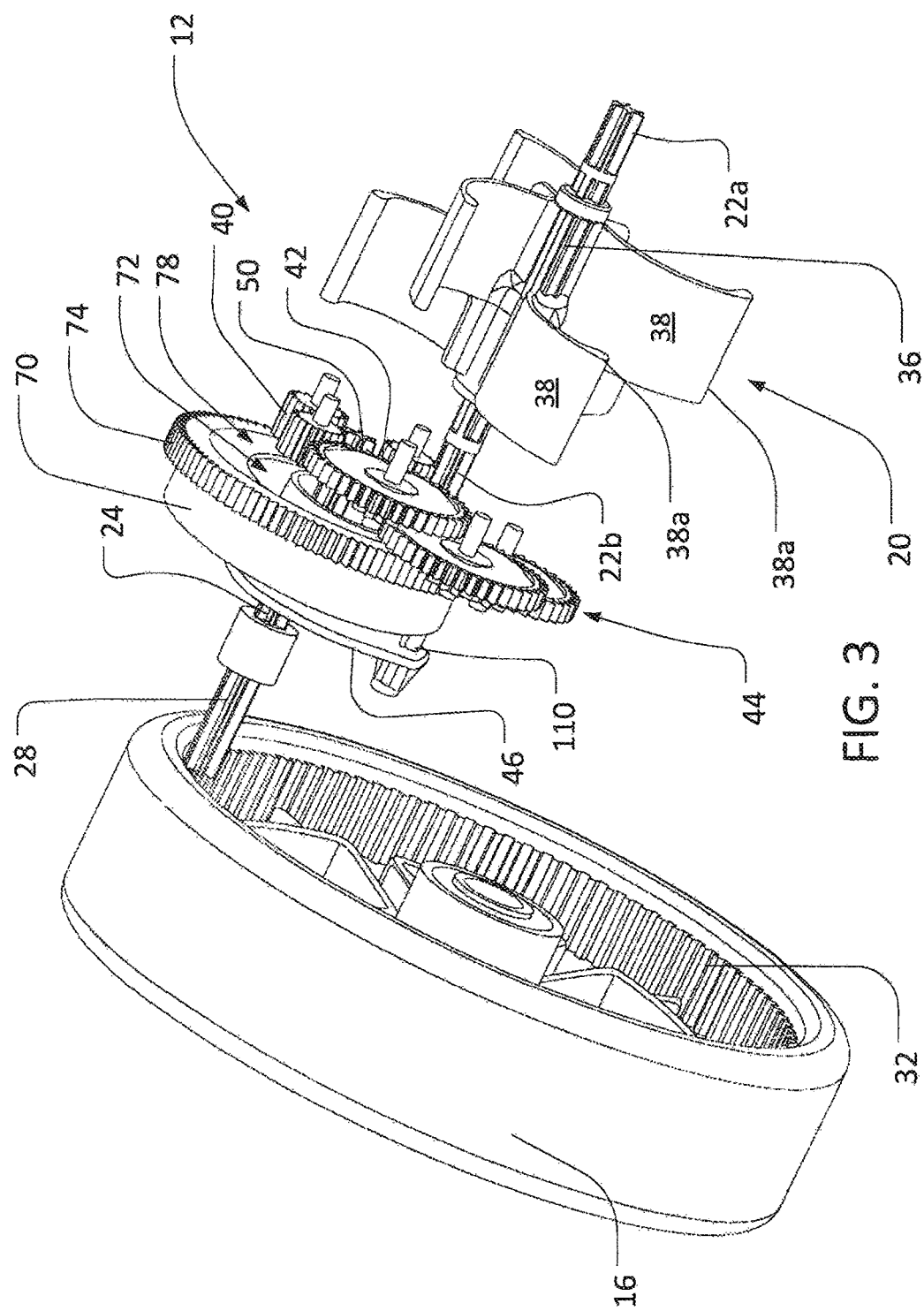
FIG. 3 is an isometric view of the steering system of FIG. 2, including one wheel, the cam, various gears, and the turbine paddle.

In one embodiment, as depicted in FIGS. 2 and 3, each end of turbine paddle gear 22 (i.e., the end powering drive shaft 24 and the end powering drive shaft 26) is formed as part of a single shaft supporting, and rotating with, turbine paddle 20, which may be supported by bearings (not shown) mounted on housing 14. In certain embodiments, however, the ends of turbine paddle gear 22 may be fainted as distinct components. For example, the outer ends of paddle gear 22 may be the ends of separate half-shafts supporting rotation of turbine paddle 20, or the outer ends of distinct shafts supporting rotation of two or more distinct paddles (not shown).

Still referring to FIGS. 2-5, the toothed portion 22b of the paddle gear 22 is in communication with the forward drive change gear 40 such that rotation of the turbine paddle 20, via passage of a fluid stream across the paddle 20, rotates the forward drive change gear 40. The paddle gear 22 is also in communication with reverse drive change gear 42 (e.g., via forward drive change gear 40), such that the reverse drive change gear 42 also rotates with the rotation of the turbine paddle 20, but in an opposite direction as the forward drive change gear 40. As depicted in FIG. 4, paddle gear 22 may drive rotation of the drive change gears 40 or 42 indirectly (e.g., via a timing gear set 44). However, in certain embodiments, the paddle gear 22 may be in direct contact with at least one of the drive change gears 40 and 42. For example, the paddle gear 22 may drive forward the drive change gear 40 through direct meshing of the gear 22 with the gear 40, and may drive the reverse drive change gear 42 indirectly (e.g., via meshing of the forward drive change goat 40 with the reverse drive change gear 42, or provision of an idler gear (not shown), or other linkage mechanism, between the paddle gear 22 and the reverse drive change gear 42).

In the embodiment depicted in FIGS. 2-5, the paddle gear 22 is also in communication with the timing gear set 44 or a different gearing mechanism, in order to drive the rotation of the drive change gears 40 and 42. The timing gear set 44 is provided in the form of one or more intermeshed spur, planetary, or other gears and is designed to impose a speed reduction between one or more output components of the timing gear set 44, and the rotational speed provided at the input of the timing gear set 44 via the paddle gear 22. The timing gear set 44 may include a connection between the paddle gear 22 and at least one of the drive change gears 40 and 42, such that the drive change gears 40 and 42 may be driven by the paddle gear 22 indirectly via the timing gear set 44 (or the separate gear set). This may be useful, for example, if it is desirable to interpose a speed reduction (or increase) between the paddle gear 22 and the drive change gears 40 and 42.

Figure 6A:
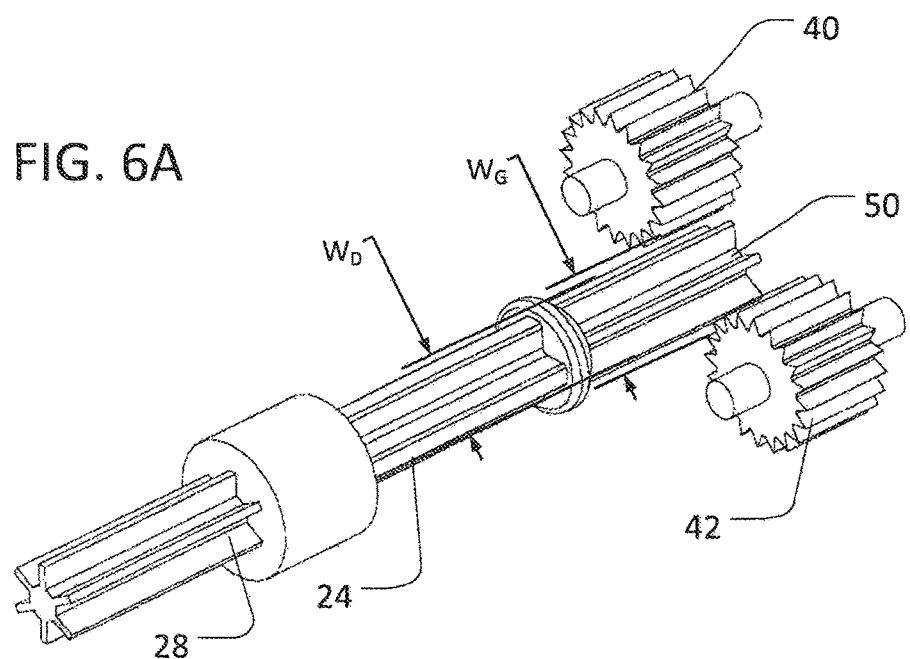
FIGS. 6A and 6B are isometric and top views, respectively, of the pivot gear, the drive shaft, and the drive change gears of the steering system of FIG. 2.
Figure 6B:
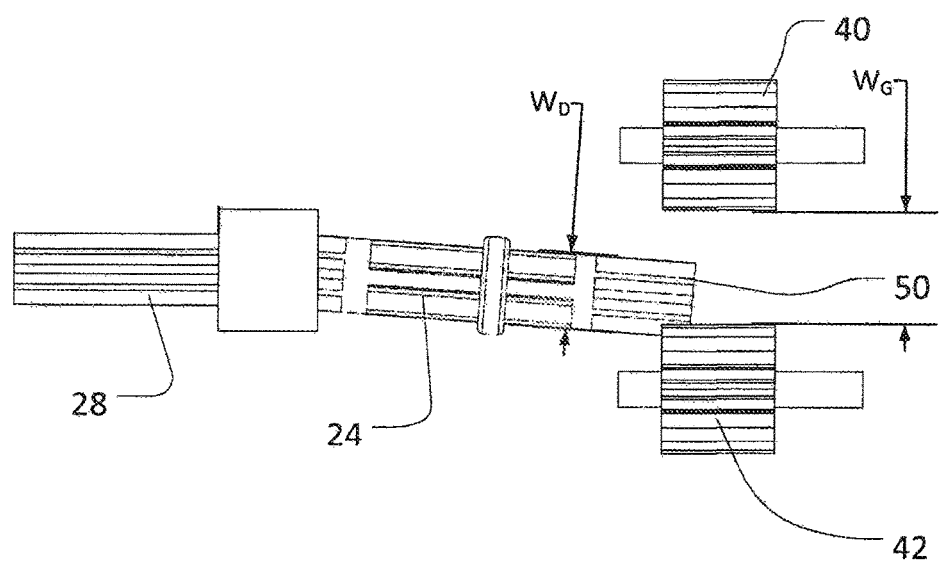

As noted above, steering system 12 also includes the drive shaft 24. As best seen in FIGS. 6A and 6B, the drive shaft 24 includes a toothed profile at an interior end 50, which is disposed adjacent to the drive change gears 40 and 42, and is configured to separately (but not simultaneously) mesh with corresponding toothed profiles on the drive change gears 40 and 42. At the exterior end, the drive shaft 24 is in communication with (e.g., directly engages) the pivot gear 28, which in turn is engaged at its outer end with the inner tooth profile 32 of the first wheel 16.

Referring also to FIGS. 6A and 6B, the inner end 50 of drive shaft 24 may be configured with a toothed profile having a characteristic width $W_D$ at the end 50 that is smaller than the distance $W_G$ between drive change gears 40 and 42 (at the relevant planes intersecting both with interior end 50 and gears 40 and 42). As such, the interior end 50 of the drive shaft 24 may be prevented from engaging both of the gears 40 and 42 simultaneously and may sometimes be oriented in a neutral position in which no rotational power is provided to the drive shaft 24 from either of the drive change gears 40, 42. However, when the drive shaft 24 is appropriately engaged by an actuator as described in more detail below, the drive shaft 24 may be moved such that the interior end 50 engages with one of the gears 40 and 42 (as depicted in FIG. 6B), with rotational power being provided, accordingly, from the engaged gear 40 or 42, through the drive shaft 24 and the pivot gear 28, to the first wheel 16.

As depicted in FIGS. 4 and 5, an actuator 46 includes a sleeve 48 having a centrally disposed opening 48a designed to receive a portion of the drive shaft 24. The actuator 46 is rotationally fixed with respect to the steering system 12, such that the actuator 46 does not, for example, co-rotate with the cam 70, as described in detail below. The actuator 46 is, however, movable with respect to the drive shaft 24 such that the actuator 46 may cause the drive shaft 24 to selectively engage with or otherwise come into communication with one of the drive change gears 40 and 42 at a particular time. For example, as depicted in FIGS. 2-5, although the actuator 46 is configured not to rotate with the cam 70, the actuator 46 is configured to move laterally with respect to the cam 70 and, accordingly, with respect to the drive gear 24. Accordingly, appropriate lateral movement of actuator 46 may move sleeve portion 48 to contact the drive shaft 24 in order to selectively urge the drive shaft 24 into contact with either of the drive change gears 40 and 42, but not both of the gears 40 and 42 simultaneously. In this way, the actuator 46 may selectively cause rotational power to be provided from only one of the drive change gears 40 and 42 to the first wheel 16, and thereby cause the first wheel 16 to be driven in a corresponding forward or reverse direction. It will be understood that the actuator 46 (or various other actuators) may move the drive shaft 24 (or various other components) in a variety of ways, and may not include a sleeve portion in every embodiment.

The actuator 46 is located adjacent to the cam 70 (described in detail below) and includes a flange 52 extending away from the sleeve 48 along one side of the cam 70. The flange 52 provides an attachment point for connecting an actuator pin 110 to the actuator 46. As depicted in FIGS. 4 and 5, the actuator pin 110 is a cylindrical pin extending away from the flange 52 to be in communication with the cam 70 through insertion of the pin 110 into a channel 84 (see FIG. 4) along one side of the cam 70.

In certain embodiments, the flange 52 may fully surround the sleeve 48, which may, for example, provide additional structural stability to the actuator 46. In certain embodiments, as depicted in FIGS. 4 and 5, the flange 52 is configured to be asymmetrical around the sleeve 48. An asymmetrical configuration may, for example, allow secure attachment of the actuator pin 110 to the actuator 46 while allowing the actuator 46 to be formed from comparatively less material and to occupy comparatively less space within the housing 14. In certain embodiments, adjustment knob 54 is also attached to flange 52, which may allow an operator to easily adjust the position of the actuator 46 relative to the cam 70.

Referring again to FIG. 2, and as also noted above, the steering system 12 also includes various components to power rotation of the second wheel 18. The components used to operate the second wheel 18 operate in a substantially independent manner from the components used to operate the first wheel 16, which provides the advantages described herein. More particularly, the paddle gear 22, the drive shaft 26, the pivot gear 30, the forward drive change gear 60, the reverse drive change gear 62, and the inner tooth profile of the second wheel 18 may interoperate to drive rotation of the second wheel 18 in a similar manner as the paddle gear 22, the drive shaft 24, the pivot gear 28, the forward drive change gear 40, the reverse drive change gear 42, and the inner tooth profile 32 of the first wheel 16 (as described in detail above). For example, in the embodiment depicted in FIG. 2, the drive shaft 26, like the drive shaft 24 includes a cylindrical, toothed profile, which may engage with one of the drive change gears 60 and 62, but not both simultaneously, in order to transmit rotational power from the turbine paddle 20 to the second wheel 18. In the embodiment depicted in FIG, 2, a spur gear 64 is provided between the paddle gear 22 and one of the drive gears 60 and 62 in order to provide rotational power from the paddle gear 22 to the drive gears 60 and 62. It will be understood, however, that various other configurations are possible, including a direct connection between the paddle gear 22 and one of the drive gears 60 and 62, or indirect connection via various other gears or gear sets (not shown).

An actuator 66 is also provided, in communication with the drive shaft 26. In the embodiment depicted in FIG. 2, for example, the actuator 66 includes a sleeve portion 68, which surrounds the drive shaft 26. In this way, movement of the actuator 66 may cause the drive shaft 26 to selectively engage one of the drive change gears 60 and 62, but not both simultaneously, to cause either forward or reverse rotation, respectively, of the second wheel 18. An arm 56 extends away from the sleeve portion 68 of the actuator 66 to a pin 58, which connects the actuator 66 to a slot 118 provided in a cam link 112. Accordingly, the actuator 66 may be moved with respect to the drive shaft 26 by movement of the cam link 112, which movement may be transmitted to the actuator 66 via the connection between the cam link 112 and the arm 66 provided by the pin 58 and the slot 118. It will be understood that various other connection types may be provided between the cam link 112 and the actuator 66.

Cam link 112 extends as a generally rigid body between the connection to the actuator 66 (i.e., at slot 118) and a side of the cam 70 that is opposite the actuator 46. At the cam 70, the cam link 112 ends in a tapered cylindrical actuator pin 114, which is in communication with the cam 70 through insertion of the pin 114 into a channel 86 along one side of the cam 70. The cam link 112 may be mounted within the housing 14 in a variety of known ways in order to provide an actuating connection between the cam 70 and the actuator 66. As depicted in FIG. 1, for example, the cam link 112 may include a pivot point 116, which may be pivotably connected to a mounting feature (not shown) within the housing 14. In this way, movement of the actuator pin 114 in one direction pivots the cam link 112 about pivot point 116, thereby causing the end of the cam link 112 with the slot 118 to move in the opposite direction. This, in turn, causes a corresponding movement of the actuator 66 and the drive shaft 26.

Referring still to FIGS. 2-5 and also to FIGS. 7A and 7B, the cam 70 is included in the steering system 12. The cam 70 is formed as a generally cylindrical body 70a having a central opening 72 and a toothed profile 74 that circumscribes the body 70a. In the embodiment depicted in FIGS. 2-5, the timing gear set 44 engages the toothed profile 74 of the cam 70 (see FIG. 4) such that the cam 70 is rotated by the rotation of the turbine paddle 20, but at a potentially different (e.g., slower) rotational speed. Also in the embodiment depicted, the opening 72 is designed to receive the sleeve portion 48 of the actuator 46 such that the cam 70 surrounds the drive shaft 24.

As best shown in FIGS. 7A and 7B, the cam 70 further includes a first cam profile 76 on one side of cam body 70a and a second cam profile 78 on the opposing side of cam body 70a. The cam profiles 76, 78 are designed to influence the direction of travel of wheels 16 and 18. In certain embodiments, the cam profiles 76 and 78 are defined, respectively and at least in part, by annular inserts 80 and 82. Each annular insert 80, 82 includes a generally annular body with a substantially smooth exterior (or other) profile, but also with various portions of the profile that either follow or deviate from the generally annular shape. For example, in the embodiment depicted in FIGS. 7A and 7B, the annular inserts 80 and 82 include, respectively, generally annular portions (or profiles) 92 and 94, and non-annular portions (or profiles) 96 and 98 that deviate from the generally annular profile of the inserts 80 and 82, as embodied along annular portions 92 and 94). As depicted, the non-annular portions 96 and 98 are defined by an indent and/or surface interruption in the inserts 80 and 82, which correspond to a radially inward deviation from the generally annular exterior profile of the inserts 80 and 82.

To further define the cam profiles 76 and 78, the cam body 70a includes channel rims 88 and 90, which generally include smooth, annular interior profiles, interrupted at various locations by deviations from the annular profiles (e.g., an indent toward the center-point of the annular profile, or a protrusion that extends away from the center-point of the annular profile). These annular and non-annular portions of the channel rims 88 and 90 are generally aligned with complimentary portions of the inserts 80 and 82 in order to provide channels 84 and 86 having a generally uniform width (i.e., a generally uniform distance between the rims 88 and 90 and, respectively, the inserts 80 and 82). For example, the annular portion of the channel rim 88 is generally aligned with the annular portion 92 of the insert 80, and the non-annular portion of the channel rim 88 is generally aligned with the non-annular portion 96 of the insert 80. Likewise, the annular portion of the channel rim 90 is generally aligned with the annular portion 94 of the insert 82 and the non-annular portion of the channel rim 90 is generally aligned with the non-annular portion 98 of the insert 82. Accordingly, the annular portions 92 and 94 of the inserts 80 and 82, along with the channel rims 88 and 90 define a generally annular geometry for the channels 84 and 86, and the non-annular portions 96 and 98 of the inserts 80 and 82, along with the channel rims 88 and 90, define a deviation (e.g., a surface interruption) from the annular geometry. Further, the entire course of the channels 84 and 86, over the annular and the non-annular portions, may exhibit a generally uniform width (e.g., a width approximately equal, respectively, to the widths of the actuator pins 110 and 114).

As discussed in greater detail below, alignment of the actuator pins 110 and 114, respectively, with the annular portions 92 and 94 of the inserts 80 and 82 may correspond with forward rotation, respectively, of the wheels 16 and 18. In contrast, and as also discussed below, alignment of the actuator pins 110 and 114, respectively, with the non-annular portions 96 and 98 of the inserts 80 and 82 may correspond with reverse rotation, respectively, of the wheels 16 and 18. As such, the annular portions 92 and 94 of the inserts 80 and 82 may be viewed as part of a "forward" portion of the cam profiles 76 and 78, while the non-annular portions 96 and 98 may be viewed as apart of a "reverse" portion of the cam profiles 76 and 78.

Other geometries may also be possible. For example, in certain embodiments a "reverse" portion of the profiles 76 or 78 may be generally annular, while a "forward" portion may be represented by an indent or protrusion. In further embodiments, more than one surface interruption may be present that corresponds with the direction of travel of the left and right wheels 16, 18.

Figure 9:
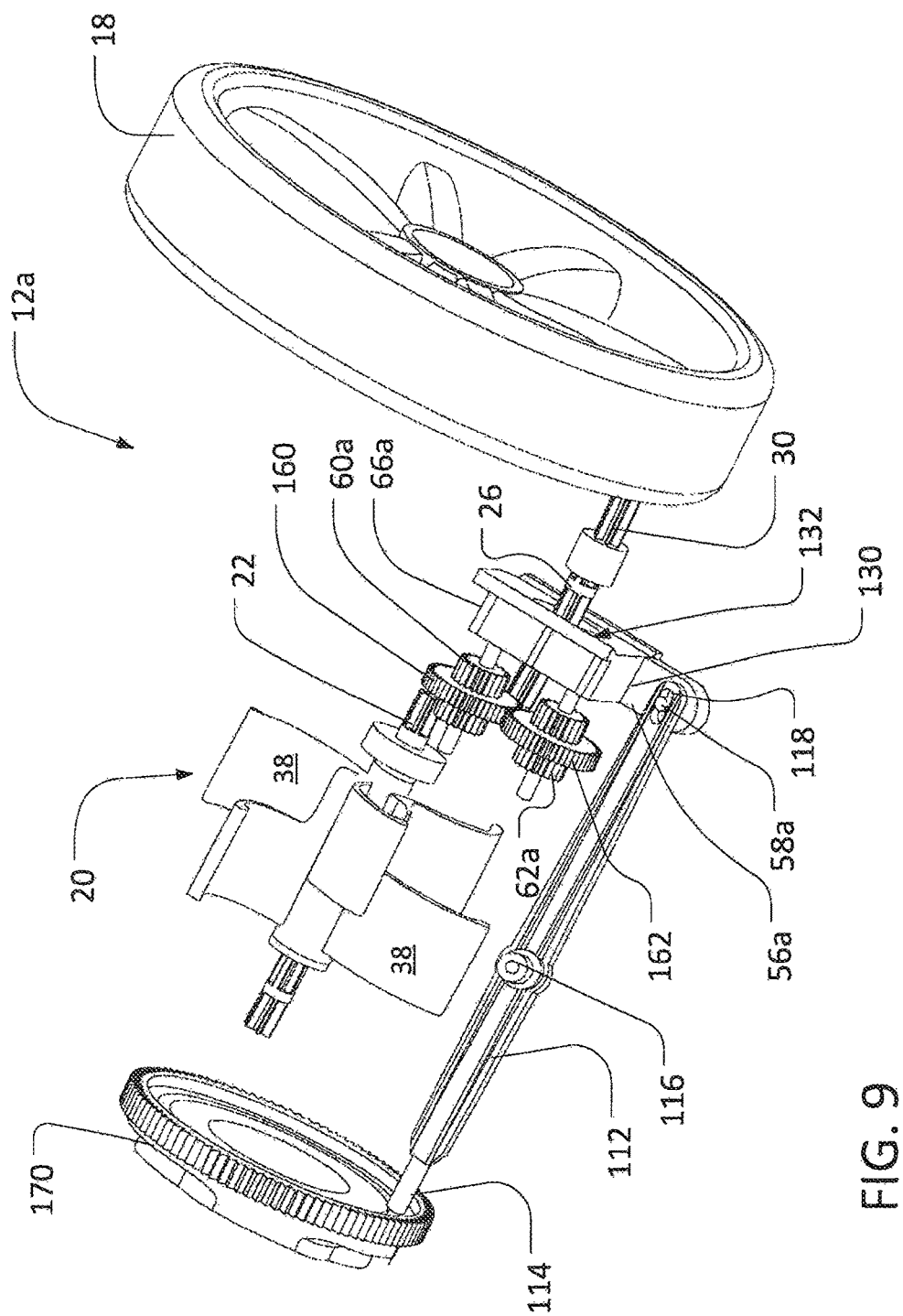
FIG. 9 is an isometric view of a portion of a steering system according to another embodiment, which utilizes the cam of FIGS. 8A and 8B.
Figure 10:
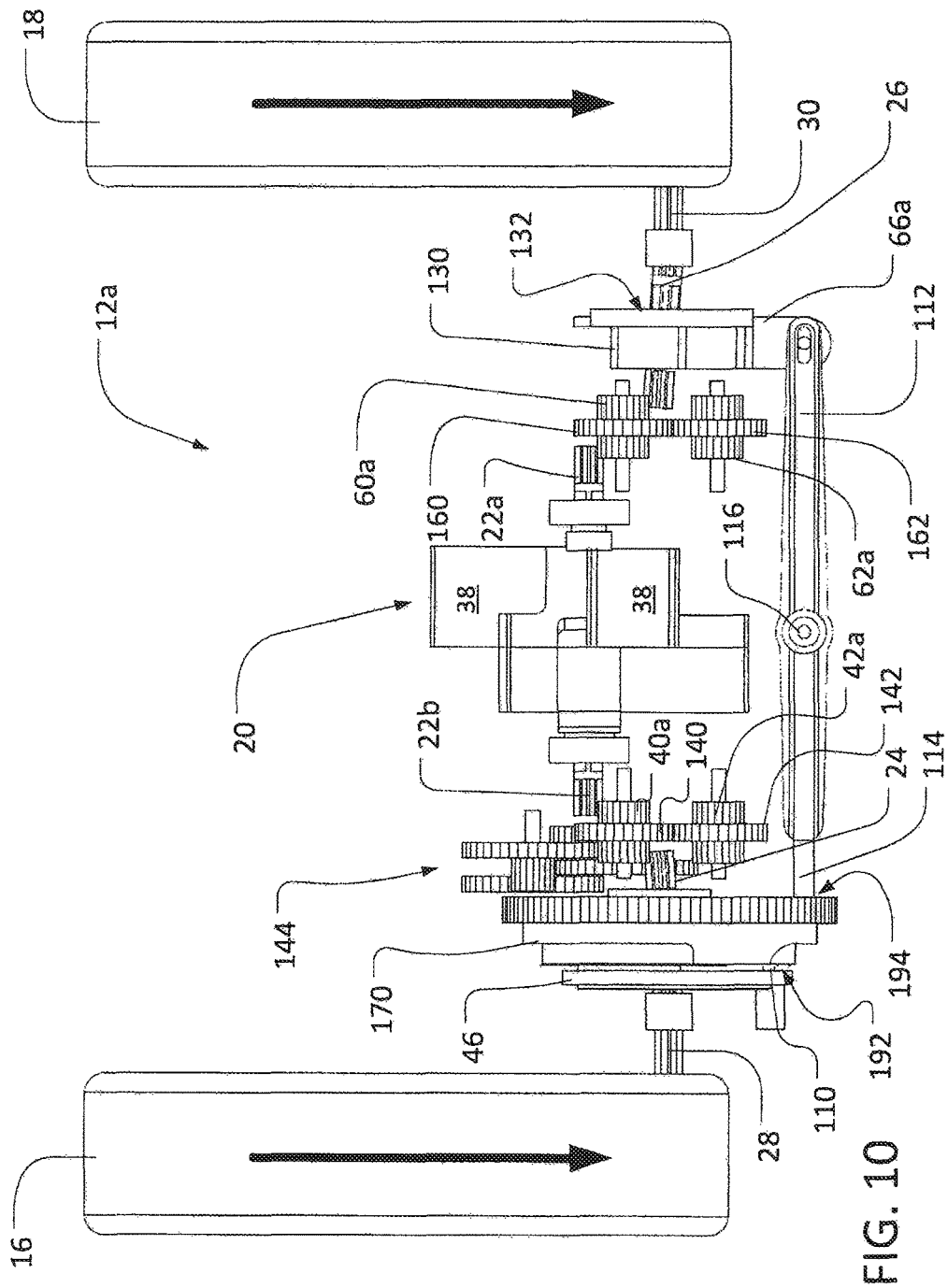
FIG. 10 is a bottom view of the steering system of FIG. 9, including the cam of FIGS. 8A and 8B, various gears and gear trains, and a turbine paddle, with the steering system in a forward-drive configuration.

As noted above, various modifications of the specific embodiments described herein may be possible. Referring, for example, to FIGS. 8 through 10, an alternative embodiment of a steering system 12a is depicted, including an alternative cam 170. The steering system 12a is similar to the steering system 12 described above and may include one or more components of the steering system 12 described previously.

Referring specifically to FIGS, 8A and 8B, the alternative cam 170 may include a cam body 170a having a central opening 172 and a toothed profile 174 that circumscribes the body 170a. The cam body 170a further includes differently configured cam profiles 176 and 178 on opposing sides of the cam 170. The cam profiles 176, 178 are also designed to influence the direction of travel of wheels 16 and 18. In certain embodiments, the cam profiles 176 and 178 are defined, respectively and at least in part, by annular inserts 180 and 182. Each annular insert 180, 182 includes a generally annular body with a substantially smooth exterior (or other) profile, but also with various portions of the profile that either follow or deviate from the generally annular shape. For example, in the embodiment depicted in FIGS. 8A and 8B, the annular inserts 180 and 182 include, respectively, generally annular portions (or profiles) 192 and 194, and non-annular portions (or profiles) 196 and 198 that deviate from the generally annular profile of the inserts 180 and 182 (i.e., as embodied along annular portions 192 and 194). As depicted, the non-annular portion 196 of the insert 180 is defined by a protrusion on the insert 180, which corresponds to a radially outward deviation from the generally annular exterior profile of the insert 180 (and the cam profile 176). In contrast, the non-annular portion 198 of the insert 182 is defined by an indent in the insert 182, which corresponds to a radially inward deviation from the generally annular exterior profile of the insert 182 (and the cam profile 178).

To further define the cam profiles 176 and 178, the cam body 170a includes channel rims 188 and 190, which generally include smooth, annular interior profiles, interrupted at various locations by deviations from the annular shape (e.g., an indent toward the center-point of the annular profile, or a protrusion that extends away from the center-point of the annular profile). These annular and non-annular portions of the channel rims 188 and 190 are generally aligned with complimentary portions of the inserts 180 and 182 in order to provide channels 184 and 186 with generally uniform width (i.e., a generally uniform distance between the rims 188 and 190 and, respectively, the inserts 180 and 182). For example, the annular portion of the channel rim 188 is generally aligned with the annular portion 192 of the insert 180 and the non-annular portion of the channel rim 188 is generally aligned with the non-annular portion 196 of the insert 180. Likewise, the annular portion of the channel rim 190 is generally aligned with the annular portion 194 of the insert 182 and the non-annular portion of the channel rim 190 is generally aligned with the non-annular portion 198 of the insert 182. Accordingly, the annular portions 192 and 194 of the inserts 180 and 182, along with the channel rims 188 and 190, define a generally annular geometry for the channels 184 and 186, and the non-annular portions 196 and 198 of the inserts 180 and 182, along with the channel rims 188 and 190, define a deviation (e.g., a surface interruption) from the annular geometry. Further, the entire course of the channels 184 and 186, over the annular and the non-annular portions, may exhibit a generally uniform width (e.g., a width approximately equal, respectively, to the widths of the actuator pins 110 and 114).

As discussed in greater detail below, alignment of the actuator pins 110 and 114, respectively, with the annular portions 192 and 194 of the inserts 180 and 182 may correspond with forward rotation, respectively, of the wheels 16 and 18. In contrast, and as also discussed below, alignment of the actuator pins 110 and 114, respectively, with the non-annular portions 196 and 198 of the inserts 180 and 182 may correspond with reverse rotation, respectively, of the wheels 16 and 18. As such, the annular portions 192 and 194 of the inserts 180 and 182 may be viewed as part of a "forward" portions of the cam profiles 176 and 178, while the non-annular portions 196 and 198 may be viewed as a part of a "reverse" portion of the cam profiles 176 and 178.

Other geometries may also be possible. For example, in certain embodiments a "reverse" portion of the profiles 176 or 178 may be generally annular, while a "forward" portion may be represented by an indent or protrusion. In further embodiments, more than one surface interruption may be present that corresponds with the direction of travel of the left and right wheels 16, 18.

Referring specifically to FIGS. 9 and 10, the steering system 12a has various components in common with the steering system 12, as well as various components that differ in form or function. For example, the actuator 46 (see FIG. 10) may be configured as in steering system 12, but an actuator 66a may be configured with a generally box-like frame 130 having a sleeve portion 132 surrounding drive shaft 26. As with the actuator 66, the actuator 66a may include an arm 56a extending to a pin 58a connected to the slot 118 of the cam link 112, which may communicate with the cam 170 via actuator pin 114. In certain embodiments, the frame 130 may slide laterally (i.e., across the axis of rotation of the drive shaft 26) along tracks or other supports (not shown) provided in housing 14, which may assist in guiding the movement of actuator 66a by cam link 112. In certain embodiments, other mounting or guiding mechanisms may be provided. For example, a guide pin (not shown) may extend from the housing 14 into a guide slot or bore (not shown) on the actuator 66a, such that actuator 66a may be moved along the guide pin by the cam link 112 in order to move the drive shaft 26.

Similarly to the actuators 44 and 66 of the steering system 12, the actuators 46 and 66a of the steering system 12a are in communication with the cam 170. For example, the actuator pin 110 is seated within channel 184 along cam profile 176. Accordingly, the actuator pin 110 follows the cam profile 176 as the cam 170 rotates to move the actuator 46 in accordance with the local geometry of the cam profile 176 as the cam profile 176 moves past the pin 110. Similarly, the actuator pin 114 is seated within channel 186 along cam profile 178. Accordingly, the actuator pin 114 follows the cam profile 178 as the cam 170 rotates to move the actuator 66a in accordance with the local geometry of the cam profile 178 as the cam profile 178 moves past the pin 114.

The steering system 12a also varies from the steering system 12 with respect to the connections between paddle wheel 20 and the wheels 16 and 18. For example, as depicted in FIG. 10, the toothed portion 22b of paddle gear 22 meshes directly with the forward drive change gear 40a such that rotation of paddle gear 22 drives a corresponding rotation of the forward drive change gear 40a. The timing gear set 144, in turn, is in direct communication with the forward drive change gear 40a, which causes the cam 170 to rotate with a predetermined timing whenever the forward drive change gear 40a is rotating, which is whenever the paddle gear 22 is rotating. Rotation of the reverse drive change gear 42a is also driven by the forward drive change gear 40a, via the meshing of the gear extensions 140 and 142. As described above with respect to the steering system 12, in the steering system 12a, the drive shaft 24 is configured to engage one of drive change gears 40a and 42a, but not both simultaneously.

Similarly, in the steering system 12a, the toothed portion 22a of the paddle gear 22 meshes directly with the forward drive change gear 60a such that rotation of the paddle gear 22 drives a corresponding rotation of the forward drive change gear 60a. The reverse drive change gear 62a is, in turn, drive by the forward drive change gear 60a, via the meshing of the gear extensions 160 and 162. As described above with respect to the steering system 12, in the steering system 12a, the drive shaft 26 is configured to engage one of drive change gears 60a and 62a, but not both simultaneously.

All of the component parts having been described, various methods of operation associated with operating the pool cleaner 10 will now be described. Referring to FIGS. 10-13, during operation of the pool cleaner 10 suction is applied to the pool cleaner 10, which causes water to flow into the pool cleaner 10 through the inlet opening (not shown) in the pool cleaner 10. As fluid contacts the blades 38 of the turbine paddle 20, the turbine paddle 20 rotates, which causes the turbine paddle gear 22 to also rotate. The rotation of paddle gear 22 drives a corresponding rotation of the forward drive change gear 40a, which in turn drives rotation of the reverse drive change gear 42a (via the extensions 140 and 142), and the cam 170 (via the timing gear set 144). Similarly, the rotation of paddle gear 22 drives a corresponding rotation of the forward drive change gear 60a, which in turn drives rotation of the reverse drive change gear 62a (via the extensions 160 and 162).

With the steering system 12a in the orientation depicted in FIG. 10, the actuator pin 110 is located along the annular (i.e., forward) portion 192 of the cam profile 176, causing the actuator 46 to cause the drive shaft 24 to engage the forward drive change gear 40a, Accordingly, rotation of the paddle gear 22 drives the rotation of the first wheel 16 in a forward direction, via the rotation of the drive shaft 24 and the pivot gear 28.

Figure 13:
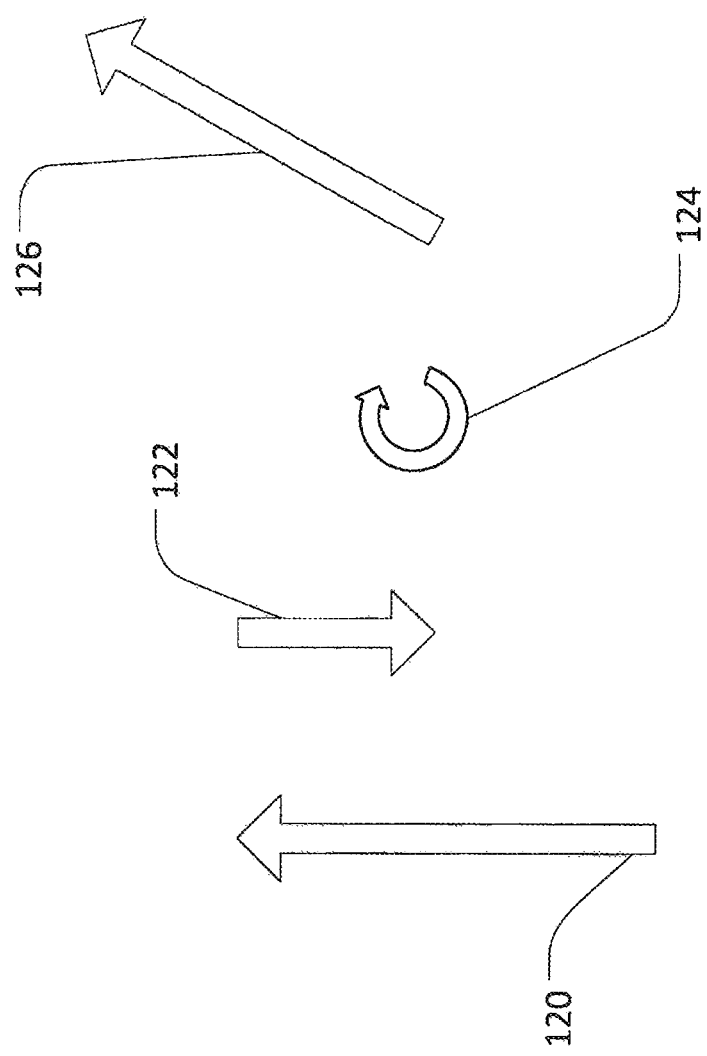
FIG. 13 is a schematic illustration of a movement path of a pool cleaner operation facilitated by the steering system of FIG. 2.

Also with the steering system 12a in the orientation depicted in FIG. 10, the actuator pin 114 is located along the annular forward) portion 194 of the cam profile 178. Through cam link 112, this causes the actuator 66a to cause the drive shaft 26 to engage the forward drive change gear 60a. Accordingly, the rotation of the paddle gear 22 drives the rotation of the second wheel 18 in a forward direction, via the rotation of the drive shaft 26 and the pivot gear 30. Referring to FIG. 13, because both wheels 16 and 18 are rotating in a forward direction, the pool cleaner 10 may move generally forward along in a forward direction 120.

Figure 11:
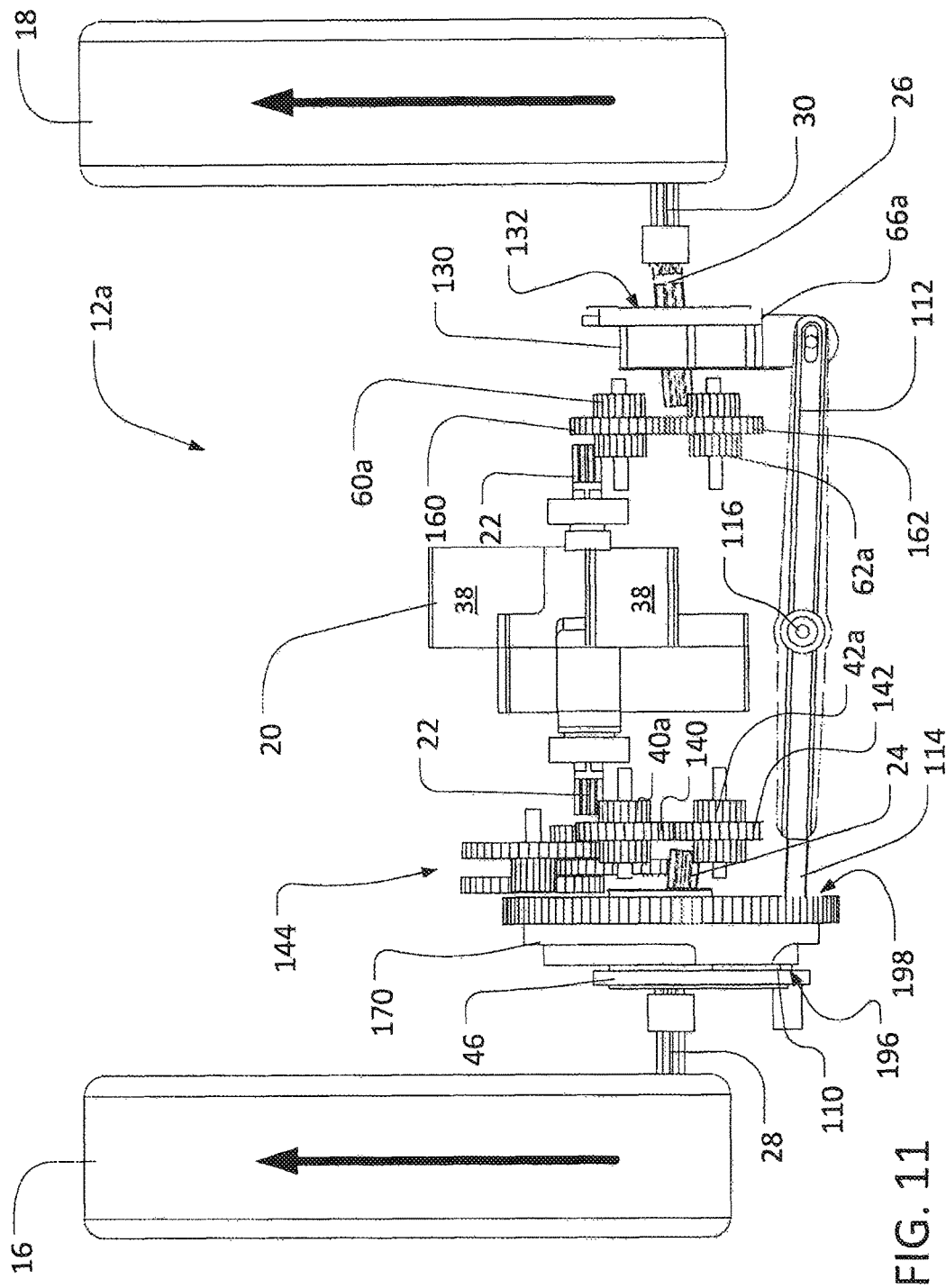
FIG. 11 is another a bottom view of the steering system of FIG. 9, with the steering system in a reverse-drive configuration.

Referring now to FIG. 11, as the cam 170 continues to rotate (i.e., as driven by the paddle gear 22 and the timing gear set 144), the cam profiles 176 and 178 move, respectively, past the actuator pins 110 and 114. Accordingly, as depicted in FIG. 11, the actuator pin 114 eventually enters the non-annular (i.e., reverse) portion 198 of the cam profile 178, the actuator pin 114 thereby moving inwardly on the cam 170. This causes cam link 112 to pivot in a clockwise direction around the pivot point 116 and correspondingly to move the actuator 66a downward (from the perspective of FIG. 11) from the orientation depicted in FIG. 10 to the orientation depicted in FIG. 11. Correspondingly, the actuator 66a causes the drive shaft 26 also to move downward (from the perspective of FIG. 11) to engage the reverse drive change gear 62a. As such, in the configuration of FIG. 10, the rotation of the paddle gear 22 in the same direction as described with regard to FIG. 10 drives the rotation of the second wheel 18 in a reverse direction.

Depending on the relative configuration of the cam profiles 176 and 178, and as depicted in FIG. 11, the actuator pin 110 may enter (or otherwise be located within) the non-annular portion 196 of the cam profile 176 at approximately the same time as the actuator pin 114 enters (or is otherwise located within) the non-annular portion 198 of the cam profile 178. Accordingly, the actuator pin 110 moves outwardly on the cam 170 and causes the actuator 46 to move downward (from the perspective of FIG. 11) from the orientation depicted in FIG. 10 to the orientation depicted in FIG. 11. Correspondingly, the actuator causes the drive shaft 24 also to move downwardly (from the perspective of FIG. 11) to engage the reverse drive change gear 42a. As such, in the configuration of FIG. 10, the rotation of the paddle gear 22 drives the rotation of the first wheel 16 in a reverse direction. Referring again to FIG. 13, because both wheels 16 and 18 may be rotating in a reverse direction, the pool cleaner 10 may move generally backward along the reverse direction 122.

Figure 12:
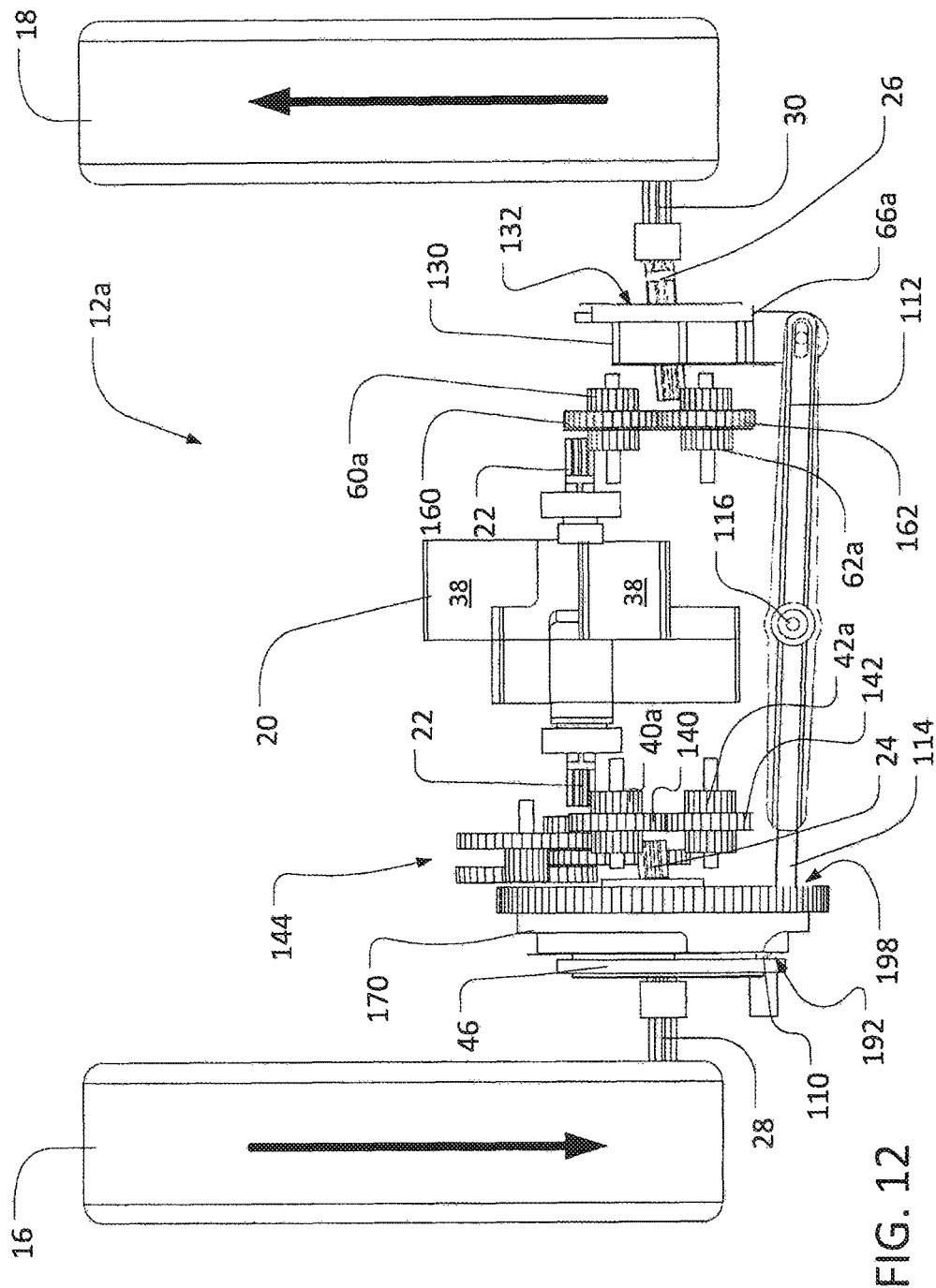
FIG. 12 is another a bottom view of the steering system of FIG. 9, with the steering system in a rotational-drive configuration.

Referring specifically to FIG. 12, as the cam 170 continues to rotate, the cam profiles 176 and 178 continue to move, respectively, past the actuator pins 110 and 114, As depicted in FIG. 12, this may eventually cause the actuator pin 110 to leave the non-annular portion 196 of the cam profile 176 and re-enter the annular portion 192 of the cam profile 176. Accordingly, the actuator pin 110 causes the actuator pin 110 to move inwardly on the cam 170, thereby causing the actuator 46 to move upward (from the perspective of FIG, 12) from the orientation depicted of FIG. 11 to the orientation depicted in FIG. 12. Correspondingly, the actuator 46 causes the drive shaft 24 also to move upwardly to re-engage the forward drive change gear 40a. Therefore, in the orientation depicted in FIG. 12, the rotation of the paddle gear 22 drives the rotation of the first wheel 16 in a forward direction.

Meanwhile, the actuator pin 114 may remain within the non-annular portion 198 of the cam profile 178 and, correspondingly, the rotation of paddle gear 22 may continue to drive the rotation of the second wheel 18 in the reverse direction. Accordingly, and referring again to FIG. 13, because wheels 16 and 18 are rotating in opposite directions, the pool cleaner 10 may execute rotation 124. As the cam 170 continues to rotate, the actuator pin 114 may eventually re-enter the annular portion 194 of the cam profile 178 (see FIG. 10), such that both of the wheels 16 and 18 are driven in forward rotation and the pool cleaner 10 travels along forward path 126, As long as cam 170 is being rotated (e.g., as long as paddle gear 22 is rotating), this cycle through the configurations of FIGS. 10-12 (and the directions depicted in FIG. 13) may be repeated indefinitely.

It will be understood that the motions indicated in FIG. 13 have been separated for clarity of presentation and as such that the indicators of FIG. 13 motions do not necessarily represent the actual position of cleaner 10. For example, the reverse movement along direction 122 may effectively retrace a portion of the path along forward direction 120, rotation 124 may be executed at the location at which the reverse movement along direction 122 ends, and forward movement along forward direction 126 may commence at the location at which rotation 124 ends, As noted above, through the appropriate configuration and orientation of cam inserts 180 and 182, a cycle of movement for the cleaner 10 may be established. Further, through selective configuration and alignment of various annular portions 192 and 194 and non-annular portions 196 and 198 of the two cam profiles 176 and 178, any variety any variety of movement cycles may be implemented. For example, alignment of annular portions 192 and 194 with respect to the relative locations of the actuator pins 110 and 114 may correspond to forward movement of the pool cleaner 10 because both of the wheels 16 and 18 may be driven in a forward rotation. Likewise, alignment of one of annular portions 192 or 194 with one of non-annular portions 198 and 196 may correspond to rotational movement of the pool cleaner 10 because the wheels 16 and 18 may rotate in opposite directions. Further, alignment of non-annular portions 196 and 198 may correspond to backward movement of the pool cleaner because both of the wheels 16 and 18 may rotate in a reverse direction. Accordingly, the length, number, and relative alignment of the annular and non-annular profiles 192, 194, 196, and 198 may be varied in order to introduce any variety of forward, reverse, and turning operations, including turning operations that rotate the pool cleaner 10 in different directions.

In certain embodiment, for example, the cam inserts 180 and 182 may be configured and aligned such that pool cleaner 10 may sequentially travel in a forward direction for a time period between about 15 seconds to about 20 seconds (corresponding to overlapping "forward" portion of the cam profiles 176 and 178, with respect to the locations of the actuator pins 110 and 114), then in a reverse direction for a time period between about 5 seconds to about 10 seconds (corresponding to overlapping "reverse" portions of the cam profiles 176 and 178, shorter than the overlapping "forward" portions noted above). The pool cleaner 10 may then execute a rotation for between about 2 seconds to about 4 seconds (corresponding to a "forward" portion of one of the cam profiles 176 and 178 overlapping with the "reverse" portion of another of the cam profiles 176 and 178, shorter than the overlapping "reverse" portions noted above), before returning to the forward direction and repeating the above-noted cycle, Similarly, in certain embodiments, other cam inserts (not shown) may be configured and aligned such that pool cleaner 10 may sequentially travel in a forward direction for a time period of between about 4 seconds to about 8 seconds (i.e., because annular portions of both a first cam profile and a second cam profile are aligned, with respect to the locations of the actuator pins 110 and 114), execute a clockwise rotation for between about 2 seconds to about 3 seconds (i.e., because an annular portion of the first cam profile is aligned with a non-annular portion of the, second other cam profile), travel in a reverse direction for a time period between about 2 seconds to about 5 seconds (i.e., because non-annular portions of both of the cam profiles are aligned), execute a :counterclockwise rotation for between about 0.5 seconds to about 1 second (i.e., because the non-annular portion of the first cam profile is aligned With the annular portion of the second cam profile), then return to the forward direction and repeat the above-noted cycle.

It will be understood that steering system 12 or other embodiments may also operate in a similar manner. For example, referring again to FIGS. 2-7, the paddle gear 22 drives the timing gear set 44 and the spur gear 64, which in turn drive, respectively, the rotation of the drive change gears 40 and 42, and the drive change gears 60 and 62. As noted above, the drive change gears 40 and 60 rotate in a forward direction and the drive change gears 42 and 62 rotate in a reverse direction. The timing gear set 44 also causes the cam 70 to rotate, at a speed determined by the gear reduction imposed by the timing gear set 44 between the paddle gear 22 and the cam 70.

As the annular portion 92 of the cam profile 76 travels past the pin 110, the pin 110 causes the actuator 46 to urge the drive shaft 24 into engagement with the forward drive change gear 40, such that the first wheel 16 is driven, via the drive shaft 24 and the pivot gear 28, in a forward direction. As the non-annular portion 96 of the cam profile 76 travels past the pin 110, the pin 110 moves inward on the cam 70 and thereby causes the actuator 46 to urge the drive shaft 24 into engagement with the reverse drive change gear 42, such that the first wheel 16 is driven, via the drive shaft 24 and the pivot gear 28, in a reverse direction. Likewise, as the annular portion 94 of the cam profile 78 travels past the pin 114, the pin 114 causes the actuator 66 to urge the drive shaft 26 into engagement with the forward drive change gear 60 via cam link 112. Accordingly, the wheel 18 is driven, via the drive shaft 26 and the pivot gear 30, in a forward direction. Further, as the reverse portion 96 of the cam profile 78 travels past the pin 114, the pin 114 moves inward on the cam 70 and thereby causes the actuator 66 to urge the drive shaft 26 into engagement with the reverse drive change gear 62 via the cam link 112. Accordingly, the second wheel 18 is driven, via the drive shaft 26 and the pivot gear 30, in a reverse direction.

In this way, by appropriate configuration and alignment of cam inserts 80 and 82, a cycle of movement for the cleaner 10 may be established. For example, when both of pins 110 and 114 are engaged, respectively, with the annular portions 92 and 94 of the cam profiles 76 and 78, both of the wheels 16 and 18 may rotate in a forward direction and the pool cleaner 10 may move in a forward direction. When the one of the pins 110 and 114 engages, respectively, the annular portion 92 or 94 of the cam profiles 76 and 78, and the other of the pins 110 and 114 engages, respectively, the non-annular portion 96 or 98 of the cam profiles 76 and 78, the wheels 16 and 18 may rotate in opposite directions and the pool cleaner 10 may execute a rotation. Finally, when both of the pins 110 and 114 engage, respectively, the non-annular portions 96 and 98 of the cam profiles 76 and 78, both of the wheels 16 and 18 may rotate in a reverse direction and the pool cleaner 10 may move backwards.

Further, through the appropriate configuration and alignment of the profiles 76 and 78 (e.g., through appropriate configuration and alignment of inserts the 80 and 82), any variety of such movement cycles may be implemented. For example, the length, alignment, and number of annular and non-annular profiles of the inserts 80 and 82 may be varied in order to introduce any variety of forward, reverse, and turning operations, including turning operations that rotate the pool cleaner 10 in different directions.

In certain embodiment, for example, the cam inserts 80 and 82 may be configured and aligned such that the pool cleaner 10 may sequentially travel in a forward direction for a time period between about 20 seconds to about 30 seconds, then in a reverse direction for a time period between about 3 seconds to about 15 seconds. The pool cleaner 10 may then execute a clockwise rotation for between about 1 seconds to about 2 seconds, travel in the forward direction for between 4 seconds to 8 seconds, and execute another clockwise rotation for between about 3 seconds to about 5 seconds, before returning to the forward direction and repeating the above-noted cycle.

Similarly, in certain embodiments, the cam inserts 80 and 82 may be configured and aligned such that pool cleaner 10 may sequentially travel in a forward direction for a time period of between about 10 seconds to about 12 seconds, execute a counter-clockwise rotation for between about 3 seconds to about 4 seconds, travel in a reverse direction for a time period between about 3 seconds to about 5 seconds, execute a clockwise rotation for between about 1 second to about 3 seconds, then return to the forward direction and repeat the above-noted cycle.

Repeating cycles of forward, reverse, and turn movements (e.g., as described above) may allow the pool cleaner 10 to traverse an entire pool surface (or surfaces) during a cleaning episode, regardless of where the pool cleaner 10 is initially located within the pool. Further, periodic reversing or turning may enable the pool cleaner 10 to avoid becoming lodged or otherwise detained in a single location in a pool for an extended amount of time. In addition, because the direction of rotation of the drive wheels 16 and 18 is independent of the direction of movement of water through the pool cleaner, the pool cleaner 10 is capable of suction (i.e., cleaning or vacuuming) during an entire cycle of forward movement, reverse movement, and turning movement, in contrast with conventional pool cleaners that do not retain sufficient suction during reverse movement.

Continuing, in contrast with conventional pool cleaners, the single cam 70 of the steering system 12, the single cam 170 of the steering system 12*a*, or another single cam may allow for reduced manufacturing or servicing costs due to initial and replacement costs of one cam versus two separate cams, as well as reduced complexity of assembly. A single cam (e.g., the cam 70 or 170) may also be stronger or more robust than separate cams of conventional cleaner steering systems, due to the inclusion of the opposing-side profiles 76 and 78 (or 176 and 178), and may allow for simpler customization through the use of a variety of inserts (e.g., the inserts 80 and 82, the inserts 180 and 182, and the like). Moreover, a single cam may allow for more reliable timing and movement cycles because, for example, there may be less likelihood of slipping or lagging between separate timing mechanisms.

In certain embodiments, various gears or other devices may be interposed between various combinations of the turbine paddle 20, the turbine paddle gear 22, the drive shafts 24 and 26, the pivot gears 28 and 30, the toothed profiles 32 and 34, or various other components described herein. For example, speed reduction gear sets, idler gears, and so on may be provided, as appropriate. As such, various combinations of the turbine paddle 20, the turbine paddle gear 22, the drive shafts 24 and 26, the pivot gears 28 and 30, the toothed profiles 32 and 34, or various other components may be in communication via direct contact (e.g., physical intermeshing of gear teeth on the paddle gear 22 with gear teeth of the drive shafts 24 and 26) or otherwise in communication.

As noted above, the cam profiles 76 and 78 (or the cam profiles 176 and 178, and so on) may be provided by way of the inserts 80 and 82 (or the inserts 180 and 182, or other inserts of different configuration). This may be useful, for example, in order to allow relatively easy customization of the profiles 92, 94, 96 and 98 (or the profiles 192, 194, 196 and 198) that collectively define the cam profiles 76 and 78 (or the cam profiles 176 and 178), as well as to allow adjustment of the orientation of various profiles on the insert 80 (or the insert 180) relative to the orientation of various profiles on the insert 82 (or the insert 182). It will be understood, however, that various cam profiles may be provided in various other ways, including through manufacture of a cam to integrally include certain profiles (e.g., profiles 76 and 78). In certain embodiments, the cam profiles 76 and 78 (or the cam profiles 176 and 178) may be similar or identical. In certain embodiments, including in the embodiments depicted in the figures, the cam profiles 76 and 78 (or the cam profiles 176 and 178) may differ from each other to varying degrees. For example, the start of the "reverse" profile 96 (from the perspective of the movement of the pin 110 along the channel 84) may be generally aligned with the start of the "reverse" profile 98 (from the perspective of the movement of the pin 114 along the channel 86), but the profile 98 may extend farther along the profile 78 than the profile 96 extends along the profile 80. Various other configurations, with various relative lengths starting points, and ending points of various forward and reverse portions are also possible.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A pool cleaner comprising:
    a housing;
    a first drive wheel positioned along a first side of the housing;
    a second drive wheel positioned along a second side of the housing; and
    a steering system engaged with the first drive wheel and the second drive wheel, the steering system including a rotating cam with a first cam profile and a second cam profile different from the first cam profile, the steering system driving the housing in a cycle of forward and turn movements by rotating the first drive wheel based on the first cam profile and rotating the second drive wheel based on the second cam profile.

2. The pool cleaner of claim 1, wherein the steering system includes a turbine paddle positioned within the housing and rotated by fluid flow through the housing.

3. The pool cleaner of claim 2, wherein the turbine paddle rotates the cam.

4. The pool cleaner of claim 3, wherein the cycle includes a full rotation of the cam and the steering system repeats the cycle.

5. The pool cleaner of claim 1, wherein the cycle includes forward, turn, and reverse movements.

6. The pool cleaner of claim 1, wherein the housing includes an outlet orifice configured to receive a suction source.

7. A pool cleaner including a first drive wheel and a second drive wheel, the pool cleaner comprising:
a rotating cam including a first cam profile and a second cam profile different than the first cam profile;
a first drive shaft in communication with the first drive wheel;
a second drive shaft in communication with the second drive Wheel;
a first actuator in communication with the first drive shaft and the first cam profile, the first actuator following the first cam profile as the cam rotates, the first actuator causing the first drive shaft to drive the first drive wheel in one of a forward direction and a reverse direction based on a position of the first actuator along the first cam profile; and
a second actuator in communication with the second drive shaft and the second cam profile, the second actuator following the second cam profile as the cam rotates, the second actuator causing the second drive shaft to drive the second drive wheel in one of a forward direction and a reverse direction based on a position of the second actuator along the second cam profile.

8. The pool cleaner of claim 7 further comprising a first pivot gear in communication with the first drive shaft, the first pivot gear engaging inner teeth of the first drive wheel, and a second pivot gear in communication with the second drive shaft, the second pivot gear engaging inner teeth of the second drive wheel, wherein the first drive shaft drives the first drive wheel via the first pivot gear, and the second drive shaft drives the second drive wheel via the second pivot gear.

9. The pool cleaner of claim 7 further comprising a first actuator pin coupled to the first actuator, the first actuator pin following the first cam profile during rotation of the cam, the first actuator moving the first drive shaft between a forward position and a reverse position based on a position of the first actuator pin along the first cam profile, the first drive shaft driving the first drive wheel in a forward direction when the first drive shaft is in the forward position and in a reverse direction when the first drive shaft is in the reverse position.

10. The pool cleaner of claim 7 further comprising a cam link and a second actuator pin, the second actuator pin being coupled to the second actuator via the cam link, the second actuator pin following the second cam profile during rotation of the cam, the second actuator moving the second drive shaft between a forward position and a reverse position based on a position of the second actuator pin along the second cam profile, the second drive shaft driving the second drive wheel in a forward direction when the second drive shaft is in the forward position and in a reverse direction when the second drive shaft is in the reverse position.

11. The pool cleaner of claim 7 further comprising a turbine paddle and a turbine paddle gear rotating with the turbine paddle, wherein the cam rotates in response to rotation of the turbine paddle.

12. The pool cleaner of claim 11 further comprising a forward drive change gear rotating based on rotation of the turbine paddle gear, and a reverse drive change gear rotating based on rotation of the turbine paddle gear, wherein the forward drive change gear and the reverse drive change gear rotate simultaneously in opposite directions with respect to each other, based on rotation of the turbine paddle gear, and wherein the first drive shaft engages the forward drive change gear when in the forward position and the reverse drive change gear when in the reverse position.

13. The pool cleaner of claim 7, wherein the cam includes a cam body, the first cam profile being oriented on a first side of the cam body and the second cam profile being oriented on a second side of the cam body that is opposite the first side.

14. The pool cleaner of Claim 7 further comprising a turbine paddle and a turbine paddle gear rotating with the turbine paddle; and a timing gear set in communication with the turbine paddle gear and the cam, the timing gear set driving rotation of the cam based on rotation of the turbine paddle.

15. The pool cleaner of claim 7, wherein the first actuator includes a sleeve portion surrounding a portion of the first drive shaft.

16. The pool cleaner of claim 15, wherein the sleeve portion of the first actuator extends into an opening through the cam, the sleeve portion surrounding the portion of the first drive shaft within the opening.

\* \* \* \* \*